United States Patent [19]

Pechmeze

[11] 4,049,375
[45] Sept. 20, 1977

[54] PROCESS FOR DYEING SYNTHETIC FIBERS FORMED FROM AROMATIC POLYESTERS AND NEW MONOAZO DYESTUFFS USEFUL FOR SUCH DYEING

[75] Inventor: Jacques Pierre Edmond Pechmeze, Paris, France

[73] Assignee: Produits Chimiques Ugine Kuhlmann, Paris, France

[21] Appl. No.: 630,055

[22] Filed: Nov. 7, 1975

[30] Foreign Application Priority Data

Nov. 21, 1974  France .................. 74.38248

[51] Int. Cl.² .............. C09B 27/00; C09B 29/08; D06P 1/02
[52] U.S. Cl. ...................... 8/41 C; 8/41 R; 8/179; 260/207; 260/207.5
[58] Field of Search ........... 8/41 C, 41 R; 260/207, 260/207.5

[56] References Cited
U.S. PATENT DOCUMENTS 2,516,303  7/1950  Dickey ........................ 260/207.5
2,700,686  1/1955  Dickey et al. ................ 260/633

Primary Examiner—Joseph L. Schofer
Assistant Examiner—A. L. Clingman
Attorney, Agent, or Firm—Beveridge, Degrandi, Kline & Lunsford

[57] ABSTRACT

The dyeing of synthetic polyester fibers wherein the dyestuff is a mono-azo dyestuff of the formula

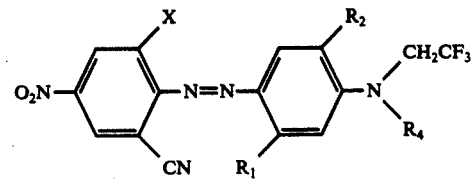

in which X represents a hydrogen, chlorine, bromine, cyano, nitro or lower alkylsulphonyl radical, $R_1$ represents hydrogen, chlorine or bromine atom or a lower alkyl, lower alkoxy or acylamino radical, $R_2$ represents a hydrogen atom or a lower alkoxy radical and $R_3$ represents a lower alkyl, β-hydroxyethyl, β-cyanoethyl, β-acetoxyethyl or β-(β-acetoxyethoxy)-ethyl group.

6 Claims, No Drawings

PROCESS FOR DYEING SYNTHETIC FIBERS FORMED FROM AROMATIC POLYESTERS AND NEW MONOAZO DYESTUFFS USEFUL FOR SUCH DYEING

DISCLOSURE OF THE INVENTION

The invention relates to the dyeing of synthetic fibers based on aromatic polyesters whereby the dyed fibers are very fast to light. The invention also relates to the dyed polyester fibers. For dyeing the fibers, there is used a monoazo dyestuff of the formula

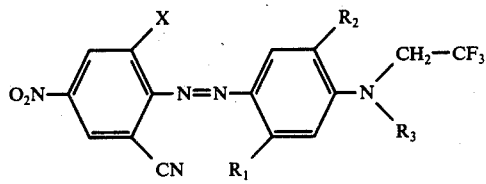

(I)

in which X represents a hydrogen, chlorine, bromine, cyano, nitro or lower alkylsulphonyl radical, $R_1$ represents hydrogen, chlorine or bromine atom or a lower alkyl, lower alkoxy or acylamino radical, $R_2$ represents a hydrogen atom or a lower alkoxy radical and $R_3$ represents a lower alkyl, $\beta$-hydroxyethyl, $\beta$-cyanoethyl, $\beta$-acetoxyethyl or $\beta$-($\beta$-acetoxyethoxy)-ethyl group.

The invention also relates to new dyestuffs of the formula

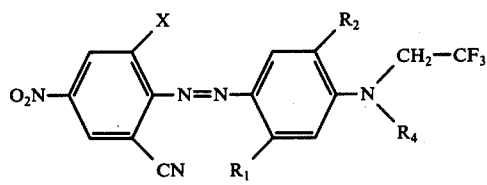

wherein X, $R_1$ and $R_2$ have the same significance as in claim 1 and $R_4$ represents a radical selected from the group consisting of a lower alkyl, $\beta$-cyanoethyl, $\beta$-acetoxyethyl or $\beta$-($\beta$-acetoxyethoxy)ethyl.

The present invention relates to the process for the coloration of synthetic fibers based on aromatic polyesters, particularly ethyleneglycol polyterephthalate, by means of water-insoluble azo dyestuffs, to the polyester fibers so dyed, and also relates to new dyestuffs useful for this purpose. By aromatic polyester fibers is meant the manufactured fiber in which the fiber-forming substance is any long chain synthetic polymer composed of an ester of a dihydric alcohol and terephthalic acid, and preferably where the ester is at least 85% by weight of the fiber. Polyester fibers are well known in the textile art, as is the difficulty usually encountered in dyeing such fibers.

Monoazo water-insoluble dyestuff, having an N-polyfluoroalkyl residue in the coupling component, have been described in U.S. Pat. Nos. 2,516,302, 2,516,303, 2,590,092, 2,594,297 and 2,618,630. These dyestuffs are intended more particularly for the coloration of textile materials based on esters of cellulose with alkyl-carboxylic acids wherein the alkyl has two to four carbon atoms, i.e. textile fibers based on the acetate, propionate, butyrate, aceto-propionate or acetobutyrate of cellulose.

It is also known (see for example U.S. Pat. No. 2,618,630) that a large number of these dyestuffs, especially those derived from mono- or di-nitrated benzene bases or those derived from a 5-acetylamino-2-alkoxy-N-(2,2,2-trifluoro-ethyl)-N-hydroxy-alkylaniline as the coupling compound, provide colorations with poor fastness to light on cellulose acetate.

It has now been found that the dyestuffs of the general formula:

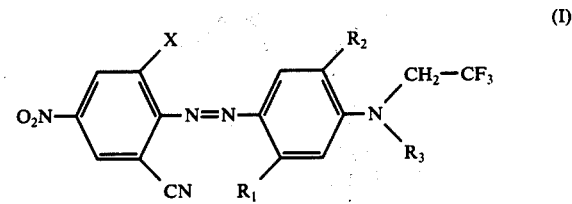

(I)

in which X represents a radical selected from the group consisting of hydrogen, chlorine, bromine, cyano, nitro and lower alkylsulphonyl, $R_1$ represents a radical selected from the group consisting of hydrogen, chlorine, bromine, lower alkyl, lower alkoxy, and acylamino, $R_2$ represents a radical selected from the group consisting of hydrogen and lower alkoxy and $R_3$ represents a radical selected from the group consisting of lower alkyl, $\beta$-hydroxyethyl, $\beta$-cyanethyl, $\beta$-acetoxyethyl and $\beta$-($\beta$-acetoxyethoxy)ethyl show an excellent affinity for synthetic fibers based on aromatic polyesters, providing colorations thereon which are remarkably fast to light. In particular, the dyestuffs of formula (I) wherein X is a nitro radical, $R_1$ is an acylamino radical, $R_2$ is a lower alkoxy radical and $R_3$ is a lower alkyl radical dye polyester fibers in blue shades of an excellent fastness to light. In formula (I), the terms lower alkyl and lower alkoxy refer to an alkyl or alkoxy group containing from 1 to 4 carbon atoms.

The dyestuffs of formula (I) in which $R_3$ is $\beta$-hydroxyethyl are described in the U.S. Pat. No. 2,516,303. The other dyestuffs are new and, as such, form part of the present invention.

In general, the dyestuffs of formula (I) may be prepared by diazotisation of an amine of the general formula

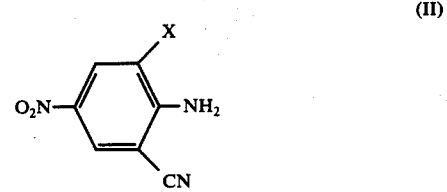

(II)

wherein X has the same significance as in Formula I above, then coupling the diazonium salt thus obtained with a coupling compound of the general formula:

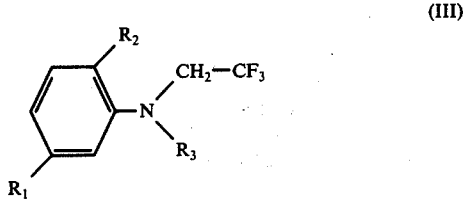

(III)

wherein $R_1$, $R_2$ and $R_3$ have the same significance as in formula (I).

The dyestuffs of formula (I) in which X is nitro may also be prepared by reacting a dyestuff of the formula:

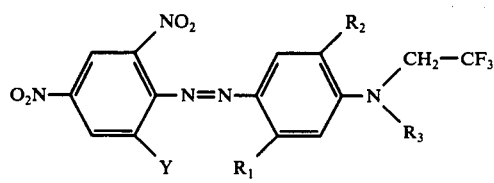

wherein $R_1$, $R_2$ and $R_3$ have the same significance as in formula (I) and Y represents a halogen atom, preferably bromine, with cuprous cyanide in a solvent, such as dimethyl formamide or pyridine. The halogen atom is thus very easily replaced by the cyano radical and a good yield of the desired dyestuff is obtained.

The coupling compounds of formula (III) may be prepared by reacting an amine of the formula:

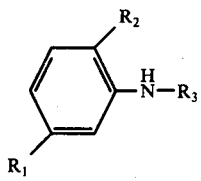

wherein $R_1$, $R_2$ and $R_3$ have the same significance as in formula (I) above, with 2,2,2-trifluoro-ethyl tosylate at a temperature between 180° and 210° C. The reaction is preferably effected in the presence of sodium carbonate and an excess of amine.

The coupling compounds of formula (III) in which $R_1$ represents an acylamino radical may also be prepared by nitration of a compound of formula (III) in which $R_1$ represents hydrogen, and then reducing the nitro radical to an amine, followed by subsequent acylation of the amine.

The dyestuffs of formula (IV) may themselves be prepared by coupling the diazo derivative of a 2-halo-4,6-dinitro-aniline with a coupling compound of the formula (III).

The coloration of synthetic fibers based on aromatic polyesters by means of the dyestuffs of formula (I) is effected according to the known processes of dyeing and printing of polyester fibers by means of the plastosoluble dyestuffs.

The following Examples, in which the parts indicated are parts by weight unless the contrary is mentioned, illustrate the invention without restricting it thereto in any manner.

EXAMPLE 1

16.3 parts of 2-amino-5-nitro-benzonitrile are dissolved in 92 parts by volume of concentrated sulphuric acid. The solution is cooled to 0° C and a solution of nitrosyl acid sulphate, obtained by mixing 7.6 parts of sodium nitrite with 92 parts by volume of concentrated sulphuric acid, is added thereto while stirring. After the introduction of the nitrosyl acid sulphate, the reaction mixture is diluted with 364 parts by volume of orthophosphoric acid ($d=1.7$), while maintaining the temperature of the mixture at 0°-5° C, and the mixture is then stirred for two hours at that temperature. 12 parts of urea are then added and stirring is continued for fifteen minutes. The acid solution is then poured onto 200 parts by volume of a mixture of distilled water and crushed ice.

The clear solution of the diazonium salt thus obtained is slowly added, with stirring, to a solution of 26 parts of N-ethyl-N-(2,2,2-trifluoro-ethyl)-N'-acetyl-meta-phenylenediamine in 400 parts by volume of glacial acetic acid. During the addition of the diazonium salt, the mixture is maintained at pH 4-5 by simultaneous addition thereto of sodium acetate. When the coupling is finished, the precipitated dyestuff is filtered, washed with distilled water until the mineral salts are completely eliminated and then dried. 42 parts of a dyestuff are obtained consisting of [2-cyano-4-nitro-benzene]-<1 azo 1>-[2-acetylamino-N-ethyl-N-(2,2,2-trifluoro-ethyl)-4-amino-benzene].

After recrystallising the dyestuff in a mixture of 90 parts by volume of ethanol and 10 parts by volume of toluene, the elementary analysis was as follows:

|  | C % | H % | F % | N % |
|---|---|---|---|---|
| Calculated for $C_{19}H_{17}N_6O_3F_3$ | 52.5 | 3.91 | 13.13 | 19.35 |
| Found | 52.0 | 4.00 | 13.0 | 19.0 |

30 parts of the dyestuff thus obtained are ground with 70 parts of the lignosulphonate known under the trademark "Reax 80 C", 500 parts by volume of Ottawa sand and 400 parts of distilled water until a fineness of the order of a micron is obtained. The dispersion is separated from the sand and dried in an oven at 50° C. The dyestuff thus dispersed dyes polyester fibers, including ethyleneglycol terephthalate fibers, a very bright ruby shade of which the fastness to light is excellent.

The N-ethyl-N-(2,2,2-trifluoro-ethyl)-N'-acetyl-meta-phenylenediamine used in this example may be obtained in the following manner:

484 parts of N-ethylaniline, 106 parts of sodium carbonate and 254 parts of 2,2,2-trifluoro-ethyl tosylate are heated for 48 hours at 190°-200° C. The cooled reaction mixture is diluted with 1000 parts by volume of distilled water and acidified with sulphuric acid until it is distinctly acid to Congo red paper. The N-ethyl-N-(2,2,2-trifluoro-ethyl)-aniline which is formed is then steam distilled. The lower organic layer of the distillate is separated and subjected to distillation under reduced pressure. 182 parts of N-ethyl-N-(2,2,2-trifluoro-ethyl)-aniline are thus obtained, distilling at 53°-54° C under 1 mm of mercury, of which the elementary analysis is as follows:

|  | C % | H % | F % | N % |
|---|---|---|---|---|
| Calculated for $C_{10}H_{12}NF_3$ | 59.11 | 5.91 | 28.08 | 6.89 |
| Found | 58.8 | 5.9 | 28.4 | 6.7 |

203 parts of this amine are introduced into 600 parts by volume of 20% oleum without exceeding the temperature of 30° C. The temperature is then reduced to below 0° C and maintained at that level while 43 parts by volume of fuming nitric acid ($d=1.52$) are added. The mixture is stirred for 4 hours at room temperature, and the reaction mass is then poured onto ice. The precipitate is filtered off, washed with distilled water until the washings are neutral, and dried. 240 parts of 3-nitro-N-ethyl-N-(2,2,2-trifluoro-ethyl)-aniline are obtained which, after recrystallisation from ethanol, melts at 66° C.

After reduction of the nitro group and acetylation according to the usual processes known in this art, N-ethyl-N-(2,2,2-trifluoro-ethyl)-N'-acetyl-meta-phenylenediamine is obtained which, after recrystallisation from a mixture containing 80 parts by volume of cyclohexane and 20 parts by volume of toluene, melts at 78°–79° C.

EXAMPLE 2

26.2 parts of 2-bromo-4,6-dinitro-aniline are dissolved in 92 parts by volume of concentrated sulphuric acid. The solution is cooled to 0° C, and a solution of nitrosyl acid sulphate, obtained by mixing 7.6 parts of sodium nitrite with 92 parts by volume of concentrated sulphuric acid, is added thereto while stirring. The solution is then diluted with 364 parts by volume of orthophosphoric acid ($d = 1.7$) while maintaining the temperature at 0°–5° C, and is then stirred for 2 hours at this 0°–5° C temperature. 12 parts of urea are added thereto and the solution is then stirred for a further 15 minutes. The acid solution is then poured onto 2000 parts by volume of distilled water and crushed ice.

The clear solution of the diazonium salt thus obtained is slowly added, with stirring, to a solution of 29 parts of 2-methoxy-5-acetylamino-N-ethyl-N-(2,2,2-trifluoro-ethyl)-aniline in 400 parts by volume of glacial acetic acid. During the addition of the diazonium salt, the pH of the mixture is maintained at pH 4–5 by simultaneous addition thereto of sodium acetate. When the coupling is finished, the precipitated dyestuff is filtered off, washed with distilled water until the mineral salts are completely removed, and dried. 51 parts of the dyestuff consisting of [2-bromo-4,6-dinitro-benzene]-<1 azo 1>-[2-acetylamino-5-methoxy-N-ethyl-N-(2,2,2-trifluoro-ethyl)-4-amino-benzene] are thus obtained.

34.4 parts of the above dyestuff are treated with 6.1 parts of cuprous cyanide in 200 parts by volume of pyridine, and the mixture is stirred for four hours at ambient temperature. The crystallised product is filtered off, washed with pyridine, and then water and is finally dried. 16 parts of the dyestuff consisting of [2-cyano-4,6-dinitro-benzene]-<1 azo 1>-[2-acetylamino-5-methoxy-N-ethyl-N-(2,2,2-trifluoro-ethyl)-4-amino-benzene] are thus obtained. 14 parts of the same dyestuff are also obtained by diluting the above pyridine filtrate with distilled water and recrystallising it from a toluene-ethanol mixture. An analysis of the dyestuff shows the following:

| Analysis | C % | H % | F % | N % |
| --- | --- | --- | --- | --- |
| Calculated for $C_{20}H_{18}N_7O_6F_3$ | 47.15 | 3.53 | 11.19 | 19.25 |
| Found | 47.20 | 3.70 | 11.30 | 19.10 |

After dispersion as in Example 1, this dyestuff dyes polyester fibers, including ethyleneglycol polyterephthalate fibers, a greenblue shade and the dyed fibers are remarkably fast to light.

The 5-acetylamino-2-methoxy-N-ethyl-N-(2,2,2-trifluoro-ethyl)aniline (m.p. 125° C) used in this Example may be prepared by operating according to the process described in Example 1 for the preparation of the N-ethyl-N-(2,2,2-trifluoro-ethyl)-N'-acetylmeta-phenylenediamine, but wherein the N-ethyl-aniline is replaced by N-ethyl ortho-anisidine.

Table (A) below summarizes other examples of dyestuffs according to the invention prepared by operating as in Example 1.

Table A

| Example | X | $R_1$ | $H_2$ | $R_3$ | Shade on polyester fibers |
| --- | --- | --- | --- | --- | --- |
| 3 | H | H | H | $CH_2CH_2OCOCH_3$ | scarlet |
| 4 | H | H | H | $(CH_2CH_2O)_2COCH_3$ | scarlet |
| 5 | $NO_2$ | $NHCOCH_3$ | H | $C_2H_5$ | violet |
| 6 | H | $NHCOCH_3$ | $OCH_3$ | $C_2H_5$ | violet |
| 7 | H | $OCH_3$ | H | $CH_3$ | red |
| 8 | $NO_2$ | $NHCOCH_3$ | $OCH_3$ | $C_2H_5$ | blue |
| 9 | H | $OCH_3$ | H | $CH_2CH_2OCOCH_3$ | red |
| 10 | Br | $NHCOCH_3$ | H | $C_2H_5$ | violet |
| 11 | H | $CH_3$ | H | $CH_2CH_2OCOCH_3$ | red |

Table (B) below gives the results of the elementary analysis obtained for each of the dyestuffs of the Examples in Table (A).

Table B

| Example | % | Elementary Analysis | | | |
| --- | --- | --- | --- | --- | --- |
| | | C | H | F | N |
| 3 | Calculated | 52.42 | 3.68 | 13.10 | 16.09 |
| | Found | 52.7 | 3.7 | 13.0 | 16.0 |
| 4 | Calculated | 52.61 | 4.18 | 11.90 | 14.61 |
| | Found | 52.7 | 4.0 | 12.0 | 14.0 |
| 5 | Calculated | 47.60 | 3.34 | 11.89 | 20.46 |
| | Found | 48.0 | 3.9 | 11.6 | 19.8 |
| 6 | Calculated | 51.72 | 4.09 | 12.28 | 18.10 |
| | Found | 52.0 | 4.5 | 12.5 | 18.2 |
| 7 | Calculated | 51.90 | 3.56 | 14.50 | 17.81 |
| | Found | 52.0 | 3.6 | 14.8 | 17.2 |
| 8 | Calculated | 47.15 | 3.53 | 11.19 | 19.25 |
| | Found | 47.2 | 3.7 | 11.6 | 18.8 |
| 9 | Calculated | 51.61 | 3.87 | 12.26 | 15.06 |
| | Found | 51.8 | 4.0 | 12.2 | 15.0 |
| 10 | Calculated | 44.44 | 3.11 | 11.11 | 16.35 |
| | Found | 44.9 | 3.2 | 11.4 | 16.2 |
| 11 | Calculated | 53.45 | 4.00 | 12.69 | 15.59 |
| | Found | 53.8 | 4.1 | 12.7 | 15.0 |

The N-β-acetoxyethyl-N-(2,2,2-trifluoro-ethyl)-aniline used as coupling compound for the preparation of the dyestuff of Example 3 may be obtained as follows: A mixture of 110 parts of N-β-hydroxyethyl-N-(2,2,2-trifluoro-ethyl)-aniline, 250 parts by volume of glacial acetic acid and 115 parts by volume of acetic anhydride is heated for two hours at 110° C. After cooling, the reaction mixture is poured into 500 parts of distilled water, and the organic phase is extracted with ethyl ether. After the ether is evaporated, the product is distilled under reduced pressure. 111 parts of N-β-acetoxyethyl-N-(2,2,2-trifluoro-ethyl)-aniline are obtained, distilling at 92° C under 0.5 mm of mercury.

On operating in an analogous way, the following coupling compounds are prepared:
N-β-(β-acetoxyethoxy)ethyl-N-(2,2,2-trifluoro-ethyl)-aniline, B.p.: 107°–110° C/0.6 mm Hg.
N-β-acetoxyethyl-N-(2,2,2-trifluoro-ethyl)-meta-anisidine... B.p.: 125°–128° C/0.9 mm Hg.
N-β-acetoxyethyl-N-(2,2,2-trifluoro-ethyl)-meta-toluidine... B.p.: 99°–100° C/0.6 mm Hg.

On operating as in Example 1, but replacing the N-ethylaniline by N-methyl-meta-anisidine, N-methyl-N-

(2,2,2-trifluoroethyl)-meta-anisidine is obtained which boils at 86° C under 0.6 mm of Mercury. Analysis thereof shows the following:

| Analysis | C % | H % | F % | N % |
| --- | --- | --- | --- | --- |
| Calculated for $C_{10}H_{12}NOF_3$ | 54.79 | 5.47 | 26.02 | 6.38 |
| Found | 54.9 | 5.4 | 26.1 | 6.2 |

EXAMPLE 12

When dispersed like the dyestuff of Example 1, the dyestuff [2-cyano-4-nitro-benzene]-<1 azo 1]-[N-(2,2,2-trifluoro-ethyl)-N-β-hydroxyethyl-4-amino-benzene] dyes polyester fibers a scarlet shade and the dyed fibers have an excellent fastness to light.

I claim:

1. Process for dyeing synthetic fibers based on aromatic polyesters by means of a water-insoluble monoazo dyestuff whereby the dyed fibers are fast to light, said dyestuff having the formula:

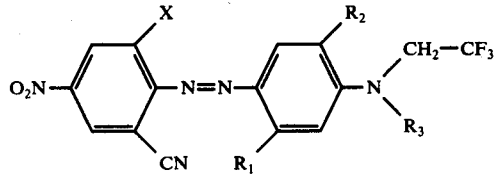

(I)

wherein X represents a radical selected from the group consisting of hydrogen, chlorine, bromine, cyano, nitro, and lower alkylsulphonyl, $R_1$ represents a radical selected from the group consisting of hydrogen, chlorine, bromine, lower alkyl, lower alkoxy and acylamino, $R_2$ represents a radical selected from the group consisting of hydrogen and lower alkoxy and $R_3$ represents a radical selected from the group consisting of lower alkyl, β-hydroxyethyl, β-cyanoethyl, β-acetoxyethyl and β-(β-acetoxyethoxy)ethyl.

2. The process as defined in claim 1 wherein X is hydrogen or nitro, $R_1$ is acetylamino, $R_2$ is hydrogen or lower alkoxy and $R_3$ is a lower alkyl.

3. Polyester fiber dyed with a dyestuff of the formula

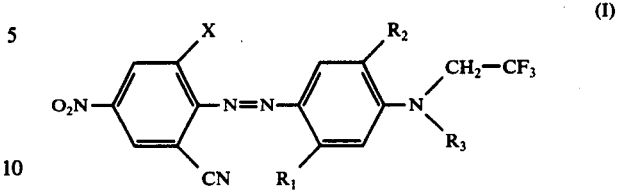

(I)

wherein X represents a radical selected from the group consisting of hydrogen, chlorine, bromine, cyano, nitro, and lower alkylsulphonyl, $R_1$ represents a radical selected from the group consisting of hydrogen, chlorine, bromine, lower alkyl, lower alkoxy and acylamino, $R_2$ represents a radical selected from the group consisting of hydrogen and lower alkoxy and $R_3$ represents a radical selected from the group consisting of lower alkyl, β-hydroxyethyl, β-cyanoethyl, β-acetoxyethyl and β-(β-acetoxyethoxy)ethyl, wherein said dyed polyester fiber is fast to light.

4. Polyester fiber as defined in claim 3 wherein X is hydrogen or nitro, $R_1$ is acylamino, $R_2$ is hydrogen or lower alkoxy and $R_3$ is a lower alkyl.

5. Polyester fiber as defined in claim 3 wherein the dye-stuff has the formula

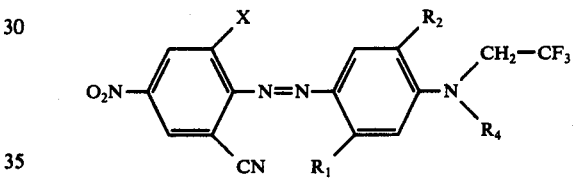

wherein X, $R_1$ and $R_2$ have the same significance as in claim 1 and $R_4$ represents a radical selected from the group consisting of lower alkyl, β-cyanoethyl, β-acetoxyethyl or β-(β-acetoxyethoxy)ethyl.

6. Polyester fiber as defined in claim 5 wherein X is a radical selected from the group consisting of hydrogen and nitro, $R_1$ is acetylamino, $R_2$ is a radical selected from the group consisting of hydrogen and lower alkoxy and $R_4$ is a lower alkyl.

* * * * *